United States Patent
Talamali

(10) Patent No.: US 7,967,981 B2
(45) Date of Patent: Jun. 28, 2011

(54) FILTER CARTRIDGE ASSEMBLY

(76) Inventor: Abdellah Talamali, Legnaro (IT)

( * ) Notice: Subject to any disclaimer, the term of this patent is extended or adjusted under 35 U.S.C. 154(b) by 0 days.

(21) Appl. No.: 12/312,528

(22) PCT Filed: Nov. 3, 2007

(86) PCT No.: PCT/EP2007/009544
§ 371 (c)(1),
(2), (4) Date: Dec. 22, 2009

(87) PCT Pub. No.: WO2008/058643
PCT Pub. Date: May 22, 2008

(65) Prior Publication Data
US 2010/0089812 A1 Apr. 15, 2010

(30) Foreign Application Priority Data
Nov. 16, 2006 (EP) .................................... 06425780

(51) Int. Cl.
*B01D 27/08* (2006.01)
*B01D 35/30* (2006.01)

(52) U.S. Cl. ......................... 210/232; 210/444; 210/450

(58) Field of Classification Search .................. 210/232, 210/444, 450
See application file for complete search history.

(56) References Cited

U.S. PATENT DOCUMENTS

| | | | | |
|---|---|---|---|---|
| 4,992,166 | A * | 2/1991 | Lowsky et al. | 210/130 |
| 5,171,430 | A * | 12/1992 | Beach et al. | 210/94 |
| 5,259,953 | A * | 11/1993 | Baracchi et al. | 210/232 |
| 5,484,529 | A * | 1/1996 | Malugade et al. | 210/448 |
| 5,556,542 | A * | 9/1996 | Berman et al. | 210/232 |
| 5,685,985 | A * | 11/1997 | Brown et al. | 210/450 |
| 6,635,175 | B2 * | 10/2003 | Stankowski | 210/232 |
| 2003/0226800 | A1 * | 12/2003 | Brown et al. | 210/497.01 |
| 2004/0182777 | A1 * | 9/2004 | Stankowski et al. | 210/455 |

* cited by examiner

*Primary Examiner* — Thomas M Lithgow
(74) *Attorney, Agent, or Firm* — I. Ionescu

(57) ABSTRACT

A filter assembly (10) for fluids, comprising a generally cylindrical container (3), a cylindrical filter cartridge (4) housed inside said container (3) and a closing cover (1) with centering means (11) of the filter cartridge (4) on the bottom of the container. The centering of the cartridge (4) during its assembling is ensured by an annular centering member (9) disposed on the outer surface of the filter cartridge (4) and cooperating with engagement means (31) formed on the inner surface of the container (3). The seal between the container (3) and the cover (1) is formed by a member (13) overmoulded to the upper edge of the container (3).

4 Claims, 3 Drawing Sheets

FILTER CARTRIDGE ASSEMBLY

The present invention concerns a filter cartridge assembly for filtering fluids, particularly for water treatment.

The assemblies of this kind generally comprise a container having an open end, such container housing a filtering member, typically a cylindrical filter cartridge, and being closed at its upper open end by a cover to which it is either directly screwed or secured through a ring nut, the cover being equipped with means for the inlet and the outlet of the fluid to be filtered and with means for fixing it to a suitable support.

Although in the following the invention will be illustrated with particular reference to an assembly comprising a container of plastic material, the invention finds advantageous application also in assemblies comprising metal containers made through pressure die-casting, casting or metal sheet forging.

In order to properly position the filtering member, the known filter assemblies provide a centering cylinder or ring at the bottom of the container and another one on the cover.

To allow the extraction of the container from the mould during the manufacturing thereof, the upper diameter of the container (i. e. at its open end) is made larger than the diameter at the bottom, or in other words the inner cross-section of the container is frusto-conical. Moreover, the inner and outer diameters of the filtering member are different depending on the requested filtering and on the manufacturer. As a result, a free space can be formed around the upper portion of the cartridge so that, when the container and the cover are screwed together for the assembling or the replacement of the filtering member, the inner wall of the container cannot keep the cartridge centered, i.e. with its axis parallel to the axis of the container.

As a matter of fact, for a correct positioning of the cartridge inside the assembly, when closing the assembly the filter should be balanced on the centering ring at the bottom of the container until even the centering member provided on the cover engages the cartridge.

A possible inclination of the cartridge from the vertical position is generally not visible to the operator when he/she start to screw the ring nut or starts to screw the container onto the corresponding cover in an assembly with two filtering members.

A tilted cartridge resting against the inner wall of the container hampers the accomplishing of a correct positioning of the cartridge in the cover with the consequence of a loss of the filtering efficiency. A longer time is requested for the assembling operation and the result might not be completely reliable.

A filter assembly with a container of a plastic material and a frusto-conical inner cross-section is disclosed for example in WO 95/32786.

Moreover, in the construction of the known containers for filter in three pieces—i.e. comprising a container, a cover and a filter—a sealing member in form of a rubber ring (O Ring) is provided between the container and the cover, with such ring being fitted into a seat.

This arrangement has the drawback to form a single seal barrier and generally requires a tightening with a special key in the servicing operations. Since the ring is merely rested on, it can come out of the seat. If this happens and/or the seal is not properly repositioned when tightening the assembly, the sealing can be impaired or deformed and must be replaced.

Moreover, in the known constructions the assembly is secured to the surrounding structure without any provision for adjusting such fixing.

US 2003/226800 is directed to an environmentally friendly, centrally-bored filter cartridge adapted to fit in a housing comprising a container closed by a cover. Centering means are provided at the bottom of the container and near the open end. Such centering means could not be adjusted to cartridge of different diameters It is an object of the present invention to provide a filter assembly allowing for an easy positioning of the cartridge during the assembling or the cartridge replacement, so that its axis is disposed and kept parallel to the axis of the container during the tightening between the cover and the container.

It is another object object of the present invention to provide a filter assembly with centering means allowing for a compensation of different diameters of the filter cartridge.

It is a further object of the invention to provide a filter assembly having a sealing member between the cover and the container that is not subject to leakages and possibly to deterioration or break-up during the maintenance operations of the assembly. An additional object of the invention is to realize an improved arrangement of the means for fixing the assembly.

These objects are achieved through a filter assembly as claimed in claim 1. Further advantageous features are recited in the dependent claims.

The invention will now be described with reference to the attached drawings that illustrate preferred, but not limiting embodiments thereof, in which.

Throughout all the Figures, the same references have been assigned to equal or substantially equivalent parts.

Figure 1:
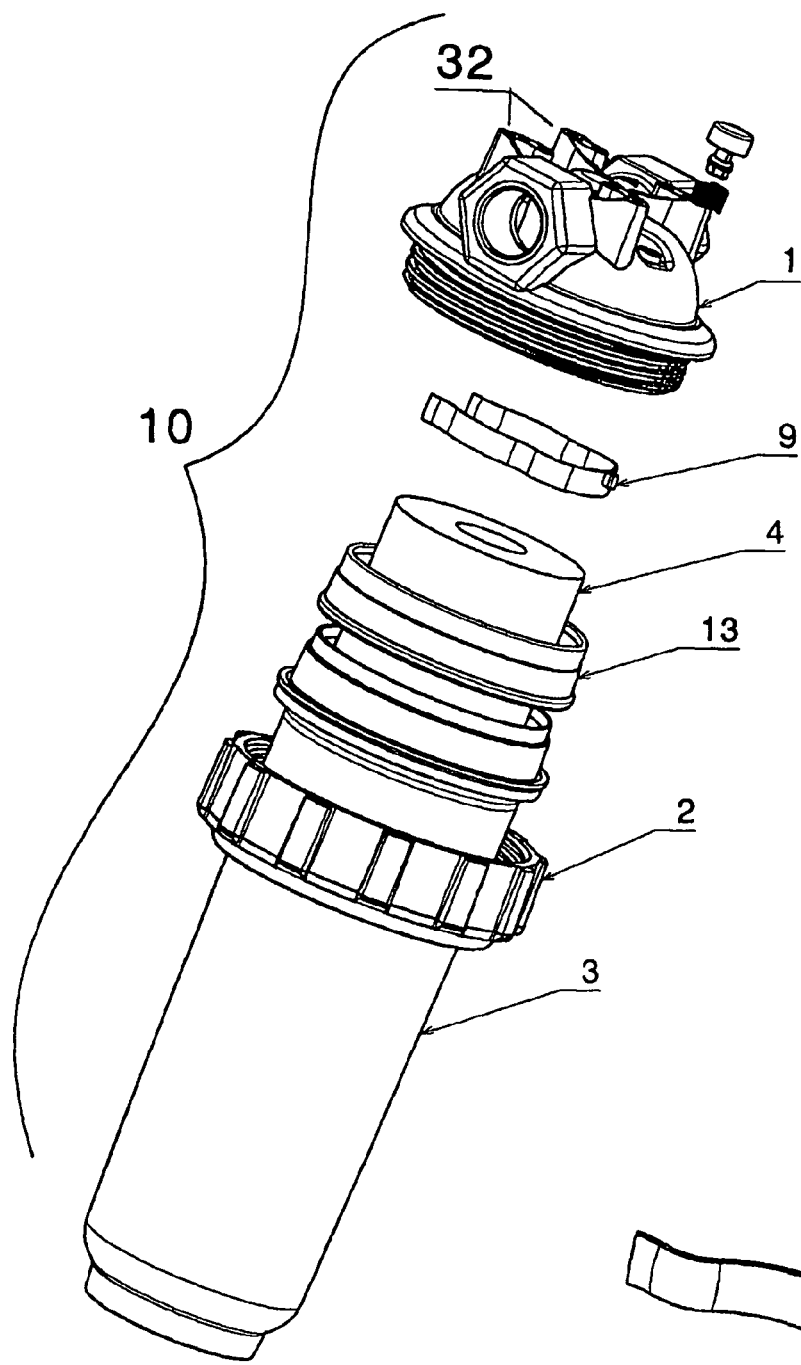
FIG. 1 is a schematic perspective view illustrating the components of an embodiment of the filter assembly according to the invention.
Figure 2:
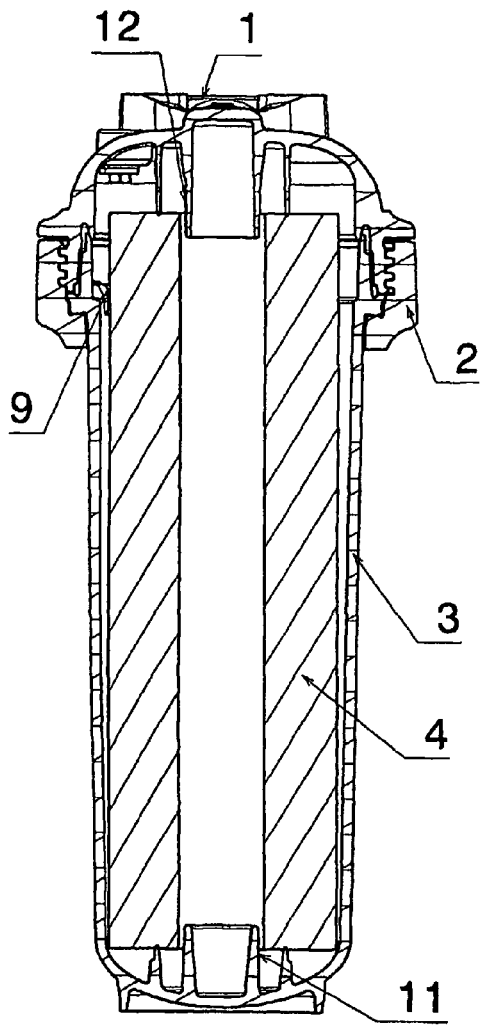
FIG. 2 is a longitudinal transverse cross-section view of the assembly of FIG. 1.

Firstly with reference to FIGS. 1 and 2, a filter assembly 10 according to the invention comprises a substantially cylindrical container 3 open at one end, adapted to house a cylindrical filter cartridge 4. In the illustrated embodiment the container is made by moulding a suitable plastic material, but this is not to be meant as a limitation since the container can be made of metal. The upper open end of the container 3 is closed by a cover or cap 1 to which a nut ring 2 formed on the external surface of the container 3 is screwed. On the bottom of the container a first centering means 11 is formed for allowing the correct positioning of the filter cartridge 4. Optionally an additional centering means 12 (FIG. 2) may be provided on the cover.

As previously mentioned, the inner diameter of the container near the open end is larger than the inner diameter at the bottom of the container or more generally the constant inner diameter of a metal container can be larger than the cartridge diameter.

Figure 4:
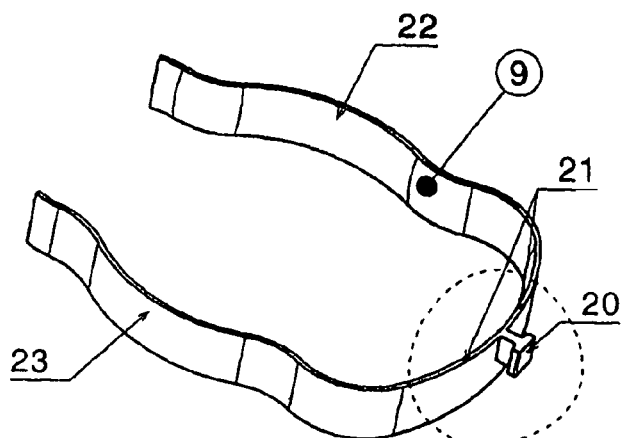
FIG. 4 show the centering member.
Figure 3:
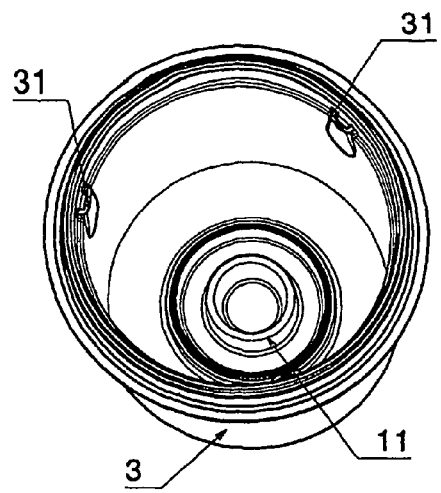
FIG. 3 is an isometric view of the inside of the container showing the means for engaging the centering member.

In accordance with the invention an additional centering member 9 (shown with more details in FIG. 4) is provided that can be fitted to the outer surface of the filter cartridge 4 and cooperates with engagement means 31 formed on the inner surface of the container 3 near its open end, as shown in FIG. 3.

Preferably, the member 9 is an open member, i.e. it is formed as a suitably shaped elastic strip or band that can be secured to filters having different diameter. As an alternative, the centering member can be shaped as a closed ring, with an elastic portion to compensate the different diameters of the cartridges filter.

In the illustrated embodiment, the centering member 9 is formed as an open strip of a plastic material that is wound around the body of the cartridge and is provided with one or more rigid projections 20. The strip is formed with a rigid portion 21 in which the projection(s) 20 is(are) formed, and with two flexible portions or sections 22, 23 that can be provided at their end with connecting means (such as for instance hook and loop fasteners).

In the illustrated embodiment (see FIG. 3), near the upper open end the inner surface of the container is provided with two or more elements 31 that comprise or form seats for an easy engagement between the cartridge and the container. When the container is of a plastic material these seats can advantageously be moulded together with the container, whereas in a metal container they are otherwise secured to the container e.g. by welding.

The engagement between the centering member 9 and the seats 31 ensures that the cartridge axis will be maintained parallel to the container axis when the cover is tightened to the container, and therefore it assures the correct final positioning of the cartridge with respect to the cover.

Figure 5:
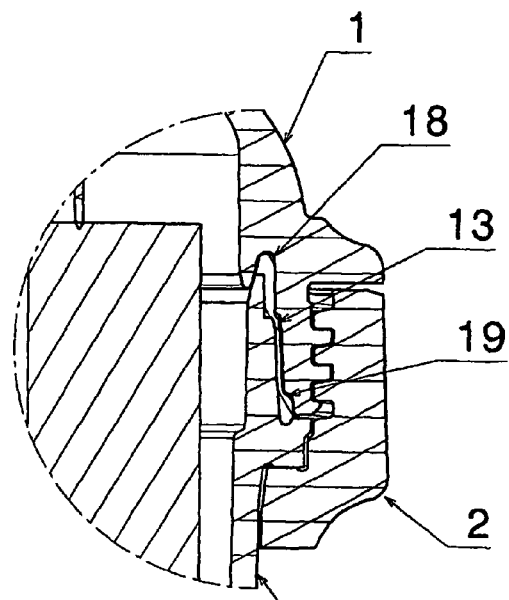
FIG. 5 is a partial cross-section view illustrating the seal between the container and the cover.

With reference to FIG. 5, according to the invention the profile of the seal between the container 3 and the cover 1 is achieved by a member 13 of a deformable synthetic material, overmoulded to the upper edge of the container 3.

According to the preferred embodiment the profile of the sealing member comprises at least two separate surfaces 18, 19 that come in contact with the cover 1 so as to form a sort of labyrinth path.

The contact surfaces between the cover 1 and the seal 13, and between the seal 13 and the container 3 are frusto-conical to increase the contact surface and to take advantage of the deformation of the container: when this latter is inflated by the inner pressure, it compresses the seal against the cover thus increasing the sealing effect.

The sealing member 13, overmoulded over the container, adheres to this latter forming a single body: this eliminates the risk of the seal expulsion from its seat and the consequent loss of sealing characteristics.

Figure 6:
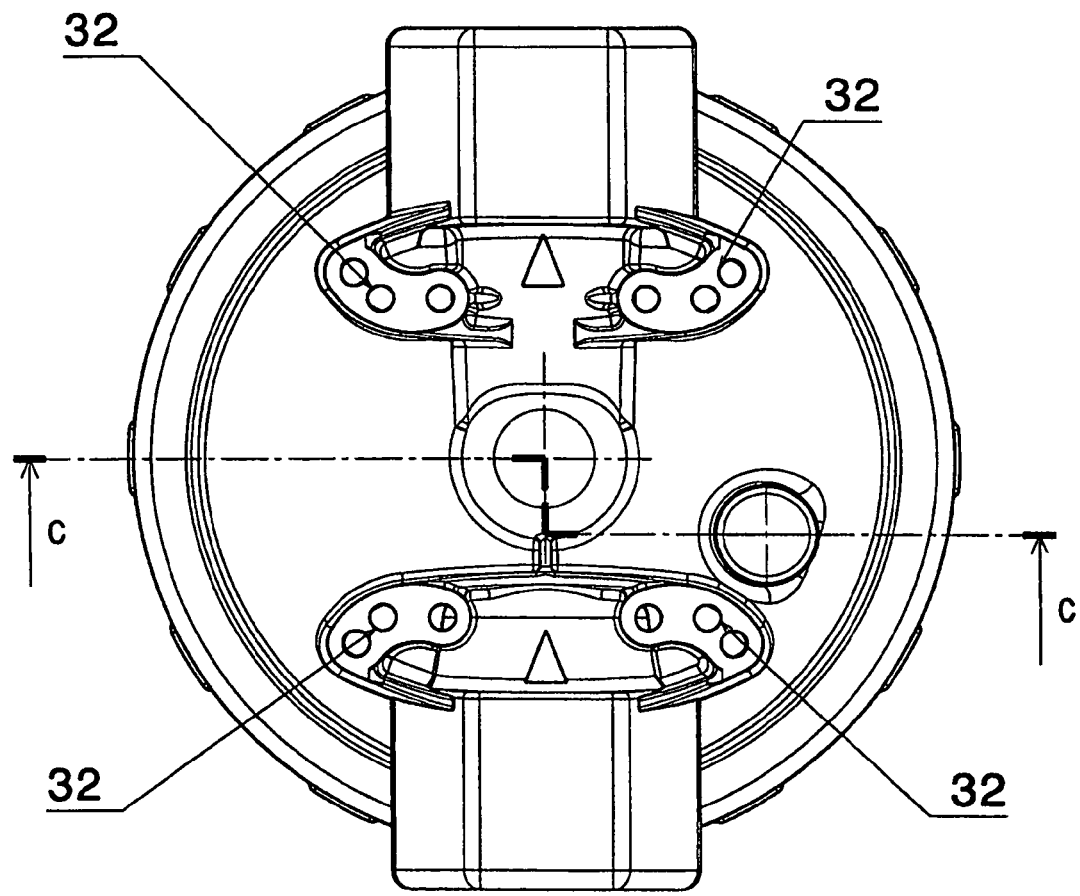
FIG. 6 is a top view of the cover illustrating the fixing means.

As better shown in FIG. 6, one or more projections are formed in the cover 1 when this latter is moulded, the projections being provided with a plurality of holes 32 that can be used for securing the assembly to the surrounding structure by means of screws, generally self-tapping screws. This way, the cover 1 provides at least twelve positions at which the assembly can be secured to the supporting structure.

Although the invention has been illustrated with reference to preferred embodiments thereof, the same is generally susceptible of other applications and changes that fall within the scope of the invention, as will be evident to the skilled of the art.

The invention claimed is:

1. A filter assembly (10) for filtering fluids, comprising:
   an elongated container (3), open at one end and provided at the bottom of the closed end with first centering means (11) for a filter cartridge and further provided with engagement means (31) formed on its inner surface;
   a cylindrical filter cartridge (4) housed inside said container (3), with the inner diameter of said container near the open end being larger than the diameter of said filter cartridge (4);
   a cover (1) adapted to close by screwing the open end of said container (3) and provided with second centering means (12) for positioning said filter cartridge (4);
   an additional centering member (9) which is at least partially radially elastic and secured to the outer surface of said filter cartridge (4) and cooperating with said engagement means (31) for keeping said cartridge centered when screwing said cover (1) to said container (3);
   wherein said container (3) is frusto-conical and
   said additional centering member (9) comprises a strip of plastic material, at least partially flexible, provided with at least a portion (20, 21) adapted for engaging said engagement means (31) located on the inner surface of said container (3);
   said centering member (9) having at least one engagement portion (21) comprising a rigid projection (20), and said engagement means (31) on the inner surface of the container formed as seats having a complementary shape to said rigid projection(s);
   said assembly (10) providing for a nut ring (2) on the external surface of said container (3) for the screwing engagement with said cover (1);
   said container (3) manufactured from a plastic material;
   said assembly (10) further comprising a seal (13) between the container (3) and the cover (1), said seal (13) comprising a member of a deformable synthetic material, said seal (13) overmoulded on the upper edge of said container (3), said seal (13) having a profile with at least two separate contact surfaces (18, 19) with the cover (1), said seal (13) forming a labyrinth configuration.

2. An assembly as claimed in claim 1, characterized in that said contact surfaces between the cover (1) and the seal (13), and between the seal (13) and the container (3) are frusto-conical.

3. An assembly according to claim 2, characterized in that said cover (1) is provided with at least one projection in which there is formed a plurality of holes (32) for securing the assembly to the surrounding structure by means of screws.

4. An assembly according to claim 3, characterized in that said cover (1) comprises at least twelve holes (32) providing for an equal number of fixing positions to the surrounding structure.

* * * * *